(12) United States Patent
Wang et al.

(10) Patent No.: US 11,520,212 B2
(45) Date of Patent: Dec. 6, 2022

(54) SYSTEM AND METHOD FOR EMITTING LIGHT USING A PHOTONICS WAVEGUIDE WITH GRATING SWITCHES

(71) Applicant: BEIJING VOYAGER TECHNOLOGY CO., LTD., Beijing (CN)

(72) Inventors: Youmin Wang, Berkeley, CA (US); Yue Lu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 31 days.

(21) Appl. No.: 17/136,956

(22) Filed: Dec. 29, 2020

(65) Prior Publication Data

US 2022/0206357 A1 Jun. 30, 2022

(51) Int. Cl.
*G02F 1/313* (2006.01)
*G01S 7/481* (2006.01)

(52) U.S. Cl.
CPC .......... *G02F 1/3132* (2013.01); *G01S 7/4818* (2013.01); *G02F 1/3137* (2013.01)

(58) Field of Classification Search
CPC ........................ G01S 7/4818; G02B 6/29334
See application file for complete search history.

(56) References Cited

U.S. PATENT DOCUMENTS

2021/0349186 A1\* 11/2021 Byrnes ..................... G02B 6/14

\* cited by examiner

*Primary Examiner* — John Bedtelyon
(74) *Attorney, Agent, or Firm* — Bayes PLLC

(57) ABSTRACT

Embodiments of the disclosure provide an emitter array for an optical sensing system. The emitter array may include a waveguide including a plurality of waveguide branches. The emitter array may also include a plurality of grating switches positioned along each of the plurality of waveguide branches and configured to selectively turn on or off the corresponding waveguide branch for transmitting light. In certain aspects, a grating switch may include an upper grating structure configured to couple to a waveguide branch when the grating switch is activated to allow the light to emit from the waveguide branch.

20 Claims, 7 Drawing Sheets

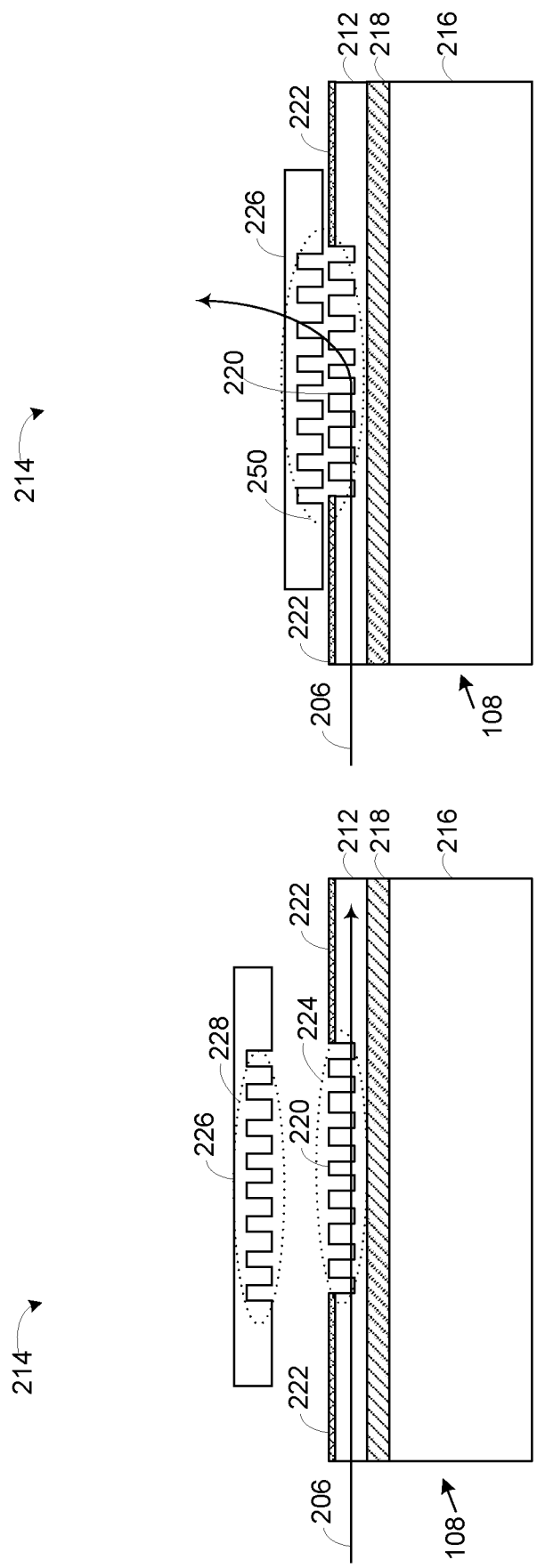

SYSTEM AND METHOD FOR EMITTING LIGHT USING A PHOTONICS WAVEGUIDE WITH GRATING SWITCHES

TECHNICAL FIELD

The present disclosure relates to an emitter array for an optical sensing system, and more particularly to, an emitter array that is configured to emit light through a grating switch positioned along a waveguide branch of the emitter array.

BACKGROUND

Optical sensing systems, e.g., such as LiDAR systems, have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

Recently solid-state LiDAR systems have been developed that use an optical phase array (OPA) to emit light. However, one challenge with conventional silicon photonics enabled OPAs is the difficulty of controlling the phase of each of the wavelength branches with the degree of accuracy needed to obtain measurements suitable for autonomous navigation. As a result, environmental impacts, such as temperature drift within the OPA, may contribute to an unintended phase shift of light emitted from a waveguide branch. The phase shift may compromise the final beam quality and accuracy of the measurements.

To correct for unintentional phase shift, conventional solid-state optical sensing systems include phase shifting elements integrated with each of the waveguide branches. Phase shifting elements may employ thermal or electro-optical tuning mechanisms to tune the phase of the light in each waveguide branches to a predetermined phase. Phase tuning elements may enable a conventional solid-state optical sensing system to correct for any phase shift and steer the transmitted laser beam towards a specific direction.

However, another challenge of conventional solid-state optical sensing system is the tuning mechanism of the phase shifting elements. Thermal phase shifting elements may use an undesirable amount of power. For example, to achieve a $2\pi$ phase shift with a thermal phase shifting element, electrical power on the order of 10 mW may be needed. Therefore, if an OPA has 100 antennas, roughly 1 W of power may be needed to fully steer the beam. Furthermore, thermal phase shifting elements may be limited to time constants on the order of a few microseconds, which may limit steering speed by an undesirable amount. Moreover, electro-optical phase shifting elements may be difficult to integrate with the waveguide branches of an OPA, and therefore difficult and/or costly to fabricate.

Hence, there is an unmet need for a silicon photonics integrated emitter array that does not use a conventional OPA that relies on phase shifting elements for beam steering.

SUMMARY

Embodiments of the disclosure provide an emitter array for an optical sensing system. The emitter array may include a waveguide including a plurality of waveguide branches. The emitter array may also include a plurality of grating switches positioned along each of the plurality of waveguide branches and configured to selectively turn on or off the corresponding waveguide branch for transmitting light. In certain aspects, a grating switch may comprise an upper grating structure configured to couple to a waveguide branch when the grating switch is activated to allow the light to emit from the waveguide branch.

Embodiments of the disclosure also provide an optical sensing system. The optical sensing system may include a light source. The optical sensing system may further include an emitter array coupled to the light source. The emitter array may include a waveguide including a plurality of waveguide branches. The emitter array may also include a plurality of grating switches positioned along each of the plurality of waveguide branches and configured to selectively turn on or off the corresponding waveguide branch for transmitting light. In certain aspects, a grating switch may comprise an upper grating structure configured to couple to a waveguide branch when the grating switch is activated to allow the light to emit from the waveguide branch.

Embodiments of the disclosure include a method of emitting light using an emitter array. The method may include coupling light from a light source to a waveguide. In certain aspects, the waveguide may comprise a plurality of waveguide branches each having a plurality of grating switches positioned thereon. The method may also include selectively activating at least one grating switch from each waveguide branch concurrently. In certain aspects, a grating switch may include an upper grating structure configured to couple to a waveguide branch when the grating switch is activated to allow the light to emit from the waveguide branch.

It is to be understood that both the foregoing general description and the following detailed description are exemplary and explanatory only and are not restrictive of the invention, as claimed.

BRIEF DESCRIPTION OF THE DRAWINGS

FIG. 2B illustrates a cross-sectional view of an exemplary grating switch that is deactivated, according to embodiments of the disclosure.

FIG. 2C illustrates a cross-sectional view of an exemplary grating switch that is activated, according to embodiments of the disclosure.

DETAILED DESCRIPTION

Figure 1:
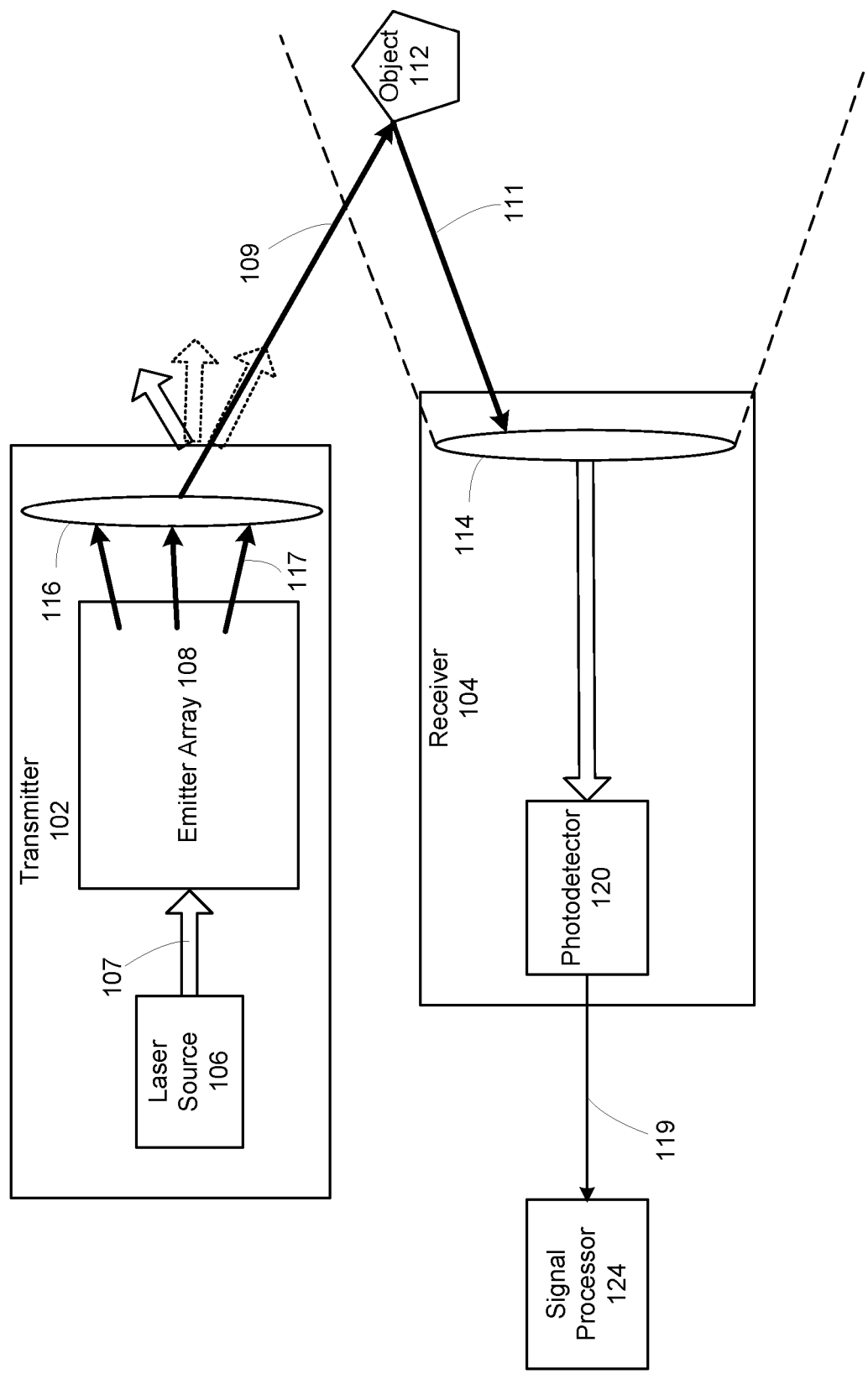
FIG. 1 illustrates a block diagram of an exemplary LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

LiDAR is an optical sensing technology that enables autonomous vehicles to "see" the surrounding world, creating a virtual model of the environment to facilitate decision-making and navigation. An optical sensor (e.g., LiDAR transmitter and receiver) creates a 3D map of the surrounding environment using laser beams and time-of-flight (ToF) distance measurements. ToF, which is one of LiDAR's operational principles, provides distance information by measuring the travel time of emitted light to reflect off an object and return to the sensor. Reflected light signals are measured and processed at the vehicle to detect, identify, and decide how to interact with or avoid objects.

Earlier iterations of optical sensing systems were electro-mechanical and mounted on bases that rotated mechanically to emit laser light in 360 degrees. In such systems, the optical sensor rotates to sense the surrounding area. These moving parts must be manufactured with a high degree of precision to ensure measurements are obtained with a suitable degree of accuracy for autonomous navigation. In addition, moving parts may make the optical sensor less resilient to vibrations. Driving in rough terrain, for example, may negatively impact ToF measurements.

To overcome some of the problems of electromechanical optical sensing systems, solid-state optical sensing systems were introduced, such as the silicon photonics-based solutions. Silicon photonics based solid-state optical sensing systems use an emitter array formed from a silicon chip that does not include moving parts. The benefits of solid-state optical sensing systems include, for example, increased range and resolution for imaging objects more accurately as compared with electromechanical optical sensing systems. This increased accuracy, combined with long-range detection, results in better classification of objects (e.g., pedestrians and vehicles) and improved movement tracking—namely, how fast an object is moving and in which direction relative to the solid-state optical sensing system.

One example of such a solid-state optical sensing system uses silicon photonics to emit light directed towards a targeted area of the surrounding environment. Silicon photonics may provide the advantage of a light source, optical path, and emitting units (e.g., waveguide branches) that may be integrated onto a single silicon chip. Conventional solid-state optical sensing systems use a silicon photonics enabled optical phased array (OPA). An OPA may include a plurality of waveguide branches within the silicon photonics that are each configured to emit light of a particular phase. The phase shifted light may input to a radiating element (e.g., an antenna) that couples the light into free space. Radiated light emitted by the radiating elements is combined in the far-field and forms the far-field pattern of the OPA. By adjusting the relative phase shift between the radiating elements, a beam can be formed and steered.

Due to the challenges faced by OPA based emitter arrays, as discussed in the BACKGROUND section above, the present disclosure provides a programmable emitter array (e.g., a semi-solid-state emitter array) as part of the optical sensing system. The emitter array of the present disclosure integrates a plurality of grating switches positioned along each of the plurality of waveguide branches. The grating switches may be configured to selectively turn on or off the corresponding waveguide branch for transmitting light. Moreover, the grating switch of the present disclosure may include an upper grating structure configured to couple to a waveguide branch when the grating switch is activated, which allows the light traveling through the waveguide branch to exit through the activated grating switch. In some embodiments, the light emitted from the activated grating switches may be collimated by a lens. Using the programmable emitter array described below, the optical sensing system of the present disclosure addresses the problems of conventional systems that use an OPA and phase shifting elements while still leveraging the increased range and resolution of conventional solid-state optical sensing systems.

Some exemplary embodiments are described below with reference to an emitter array used in LiDAR system(s), but the application of the emitter array disclosed by the present disclosure is not limited to the LiDAR system. Rather, one of ordinary skill would understand that the following description, embodiments, and techniques may apply to any type of optical sensing system (e.g., biomedical imaging, 3D scanning, tracking and targeting, free-space optical communications (FSOC), and telecommunications, just to name a few) known in the art without departing from the scope of the present disclosure.

FIG. 1 illustrates a block diagram of an exemplary LiDAR system 100, according to embodiments of the disclosure. LiDAR system 100 may include a transmitter 102 and a receiver 104. Transmitter 102 may emit laser beams along multiple directions. Transmitter 102 may include, among others, one or more laser sources 106, an emitter array 108, and one or more lenses 116.

Transmitter 102 can sequentially emit a stream of pulsed laser beams in different directions within a sensing range (e.g., a range in angular degrees), as illustrated in FIG. 1. Laser source 106 may be configured to provide a laser beam 107 (also referred to as "native laser beam") to emitter array 108. In some embodiments of the present disclosure, laser source 106 may generate a pulsed laser beam in the ultraviolet, visible, or near infrared wavelength range.

In some embodiments of the present disclosure, laser source 106 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 107 provided by a PLD may be greater than 700 nm, such as 760 nm, 785 nm, 808 nm, 848 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser source 106 for emitting laser beam 107. Laser beam 107 may be coupled into emitter array 108 via an optical fiber, silicon photonics waveguide, or any other optical mechanism and/or technique known in the art.

Emitter array 108 may have a programmable silicon photonics architecture, for example. More specifically, emitter array 108 may include a waveguide (see FIGS. 2A-2F) with a plurality of waveguide branches (see FIGS. 2A-2F). A plurality of grating switches (see FIGS. 2A-2F) may be positioned along each of the plurality of waveguide branches. Each of the plurality of waveguide switches may be configured to selectively turn on or off the corresponding waveguide branch for emitting light 117. For example, the grating switches may include, among others, at least an upper grating structure (see FIGS. 2B and 2C). The grating index (e.g., grating pattern) of the upper grating structure may be selected based at least in part on the wavelength of light traveling through the waveguide branch. By selecting the appropriate grating pattern, when the upper grating structure couples to the waveguide branch, light traveling in the waveguide branch is diffracted by the upper grating structure and exits through the grating switch.

Furthermore, the upper grating structure may be anchored to the waveguide substrate on either side of the corresponding waveguide branch and grating switch. One or more torsion springs (described in connection with FIG. 2C) may couple the upper grating structure to anchors (described in connection with FIG. 2C) formed on either side of the waveguide branch. Furthermore, one or more electrodes (described in connection with FIGS. 2B-2D) located on or within the waveguide substrate may be used to selectively activate and/or deactivate the corresponding grating switch. In certain implementations, each of the grating switches may also comprise a lower grating structure. Here, a first grating index of the upper grating structure and a second grating index of the lower grating structure may form a grating device with a collective grating index that diffracts light traveling in the waveguide branch light, which allows light to exit into free space through the activated grating switch.

When the grating switch is deactivated, the upper grating structure may float above the grating switch, suspended by the torsion springs and/or anchor. When the upper grating structure floats above the grating switch, light traveling in the waveguide branch cannot "see" the grating pattern, and thus remains in the waveguide branch. When the grating switch is activated, the upper grating structure may be pulled down to couple with the waveguide branch allowing light traveling through the corresponding waveguide branch to "see" the light and to exit through the grating switch by way of diffraction. Additional details associated with the grating switches of emitter array 108 are described below in connection with FIGS. 2A-2F.

By activating different combinations of grating switches concurrently, emitter array 108 may transmit a laser beam in various different directions to cover a desired field of view (FOV). The light that exits the grating switches may be diffuse and uncollimated. Hence, to collimate the diffuse light and to focus it in a particular direction, transmitter 102 may include a lens 116 configured to collimate the light 117 diffracted through the grating switches into a laser beam 109 that is emitted into free space towards object 112.

Object 112 may be made of a wide range of materials including, for example, non-metallic objects, rocks, rain, chemical compounds, aerosols, clouds and even single molecules. In some embodiments of the present disclosure, transmitter 102 may also include optical components (e.g., lenses) that can laser light emitted through one or more grating switches in the emitter array into a narrow laser beam to increase the sensing resolution, e.g., as described below in connection with FIGS. 2E and 2F.

In some embodiments, receiver 104 may be configured to detect a returned laser beam 111 returned from object 112. The returned laser beam 111 may be in a different direction from laser beam 109. Receiver 104 can collect laser beams returned from object 112 and output electrical signals reflecting the intensity of the returned laser beams. Upon contact, laser light can be reflected by object 112 via backscattering, such as Rayleigh scattering, Mie scattering, Raman scattering, and fluorescence. As illustrated in FIG. 1, receiver 104 may include a lens 114 and a photodetector 120. Lens 114 may be configured to collect light from a respective direction in its FOV and converge the laser beam to focus before it is received on photodetector 120. At each time point during the sensing process, returned laser beam 111 may be collected by lens 114. Returned laser beam 111 may be returned from object 112 and have the same wavelength as laser beam 109.

Photodetector 120 may be configured to detect returned laser beam 111 returned from object 112. In some embodiments, photodetector 120 may convert the laser light (e.g., returned laser beam 111) collected by lens 114 into an electrical signal 119 (e.g., a current or a voltage signal). Electrical signal 119 may be generated when photons are absorbed in a photodiode included in photodetector 120. In some embodiments of the present disclosure, photodetector 120 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 100 may also include one or more signal processor 124. Signal processor 124 may receive electrical signal 119 generated by photodetector 120. Signal processor 124 may process electrical signal 119 to determine, for example, distance information carried by electrical signal 119. Signal processor 124 may construct a point cloud based on the processed information. Signal processor 124 may include a microprocessor, a microcontroller, a central processing unit (CPU), a graphical processing unit (GPU), a digital signal processor (DSP), or other suitable data processing devices.

Figure 2A:
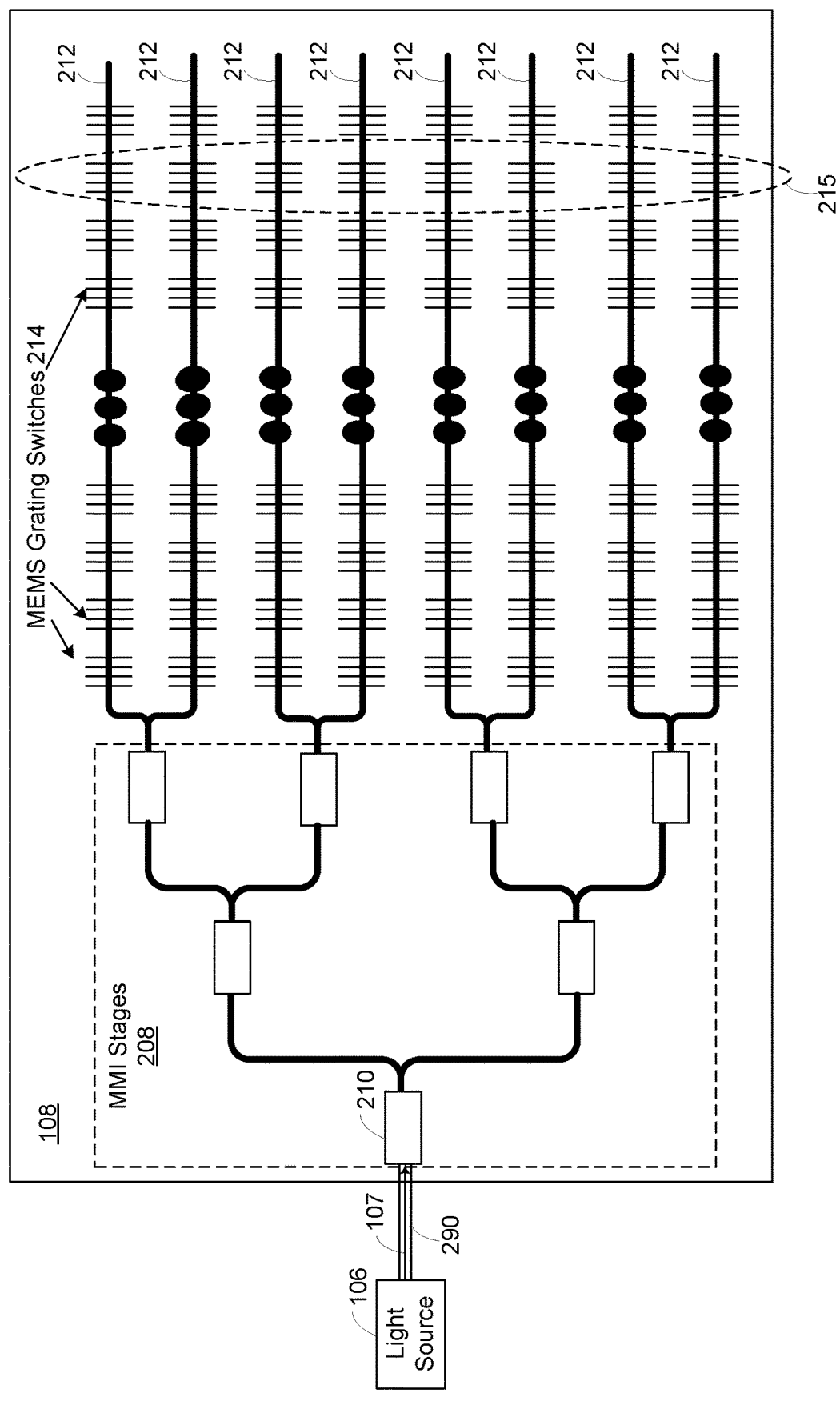
FIG. 2A illustrates a top view of an exemplary emitter array with a plurality of grating switches, according to embodiments of the disclosure.

FIG. 2A illustrates a detailed top view of portions of transmitter 102 shown in FIG. 1, according to embodiments of the disclosure. In particular, FIG. 2A illustrates additional details of emitter array 108. Furthermore, as seen in FIG. 2A, laser beam 107 emitted by laser source 106 may be coupled into emitter array 108 using, e.g., an optical fiber 290. Emitter array 108 may include, among others, a plurality of multi-mode interferometer (MMI) stages 208, a plurality of waveguide branches 212, and a plurality of grating switches 214 positioned along each of the waveguide branches 212.

Each of the MMI stages 208 may include at least one MMI coupler 210 (e.g., a 1×2 MMI coupler) configured to split laser beam 107 into different optical paths. Each MMI coupler 210 may be a micro-scale structure in which light waves can travel, such that the optical power is split or combined in a predictable way. Within MMI coupler 210, light is confined and guided into different optical paths. For example, an exemplary 1×2 MMI coupler 210 may be a 50-50 splitter, such that light enters along one path and exits along two paths, with half the power in each exit path. The entrance and exit paths may be narrow waveguides, and the MMI coupler 310 may be in the shape of a broad rectangular box. In the example illustrated in FIG. 2A, there are three MMI stages 208 such that laser beam 107 is split into eight different paths of emitter array 108, each associated with a different waveguide branch 212. Each waveguide branch 212 may include a transparent dielectric material through which light may travel, e.g., such as a material with a low absorption of certain wavelengths of light. In other words, the material used for waveguide branch 212 may be selected based on the wavelength of the laser beam 107 emitted by light source 106. By way of example and not limitation, when the wavelength of laser beam 107 is 1550 nm, silicon may be the material used for waveguide branch 212. This is because light at 1500 nm may propagate through a silicon waveguide without losses or with negligible losses to the intensity of laser beam 107 due to absorption by the material of waveguide branch 212. On the other hand, when the wavelength of laser beam 107 is 940 nm, for example, silicon nitride or silicon dioxide may be the material used for waveguide branch 212. This is because light at 940 nm may propagate through a silicon nitride or silicon dioxide waveguide without losses or with negligible losses to the intensity of laser beam 107 due to absorption by the material of waveguide branch 212. However, waveguide branch 212 is not limited to silicon, silicon nitride, or silicon dioxide. On the contrary, waveguide branch 212 may be formed of any dielectric material that enables the propagation of light without departing from the scope of the present disclosure. Furthermore, although eight waveguide branches 212 are depicted in the example illustrated in FIG. 2A, any number of waveguide branches 212 and/or MMI stages 208 may be included in emitter array 108 without departing from the scope of the present disclosure.

Furthermore, a plurality of grating switches 214 may be positioned along each waveguide branch 212. Each grating switch 214 may include at least an upper grating structure that is individually actuatable to activate or activate grating switch 214, e.g., additional details of which are set forth below in connection with FIGS. 2B and 2C.

Figure 2D:
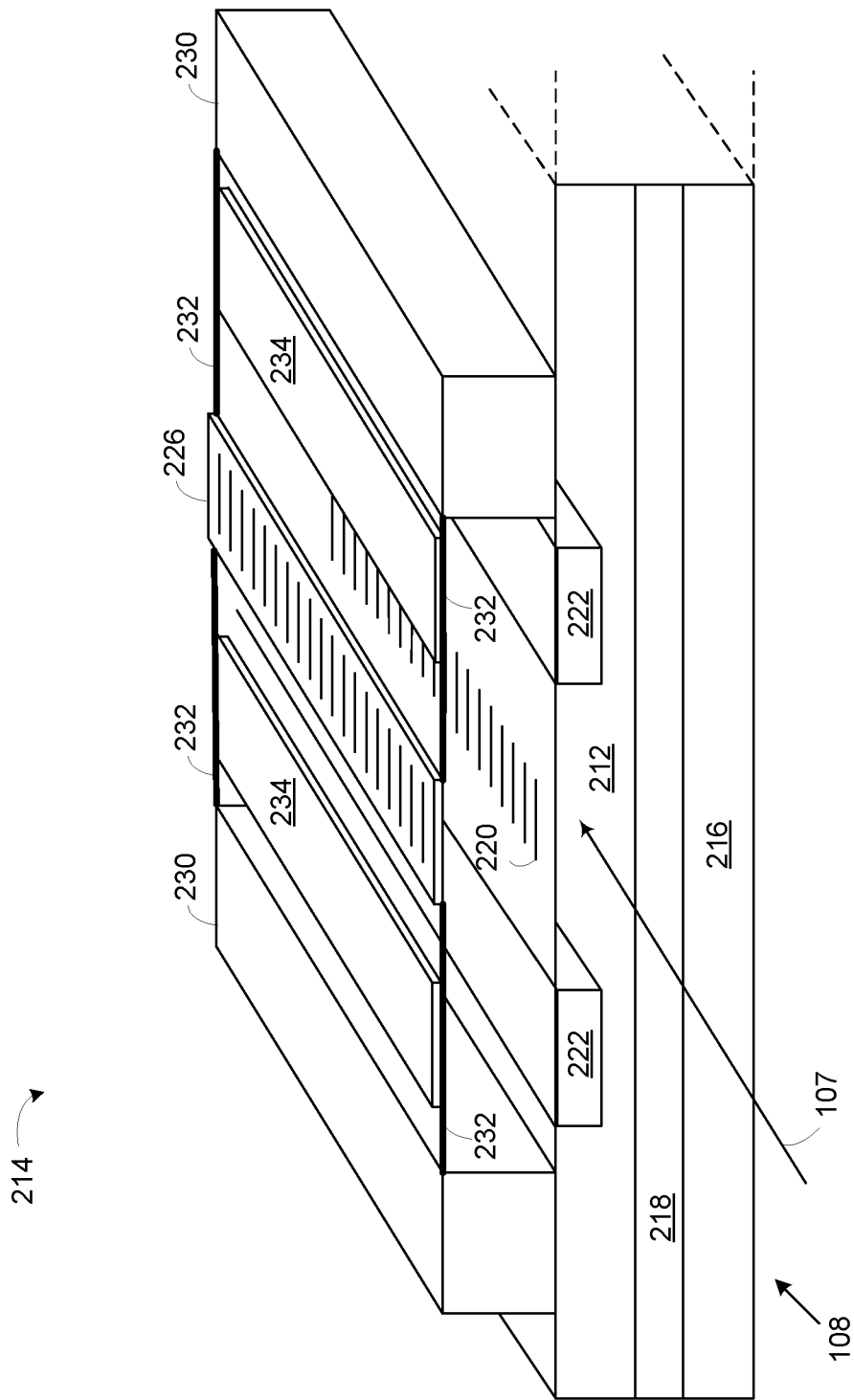
FIG. 2D illustrates a perspective view of an exemplary grating switch, according to embodiments of the disclosure.
Figure 2F:
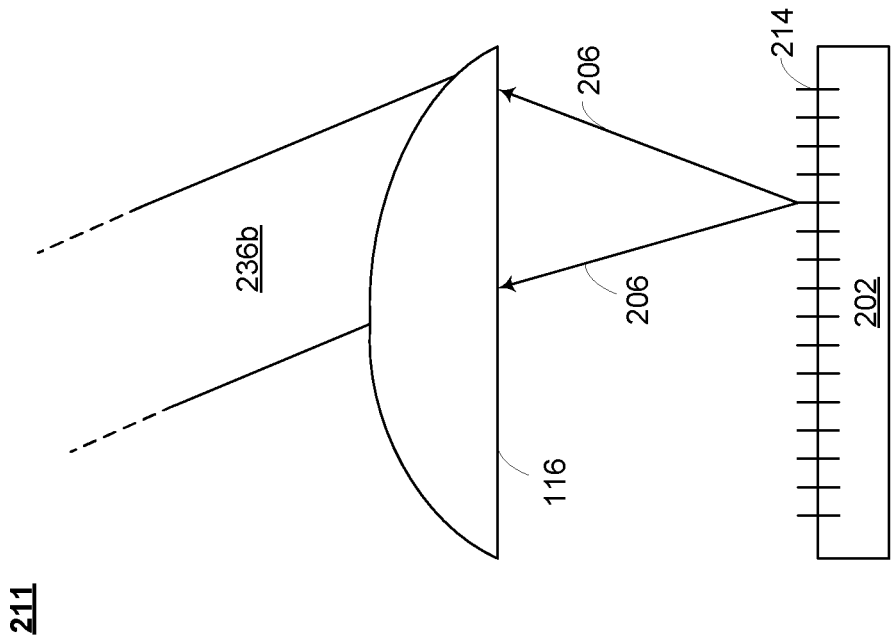
FIG. 2F is a diagram illustrating light emitted by the emitter array depicted in FIG. 2A in a second direction, according to embodiments of the disclosure.
Figure 2E:
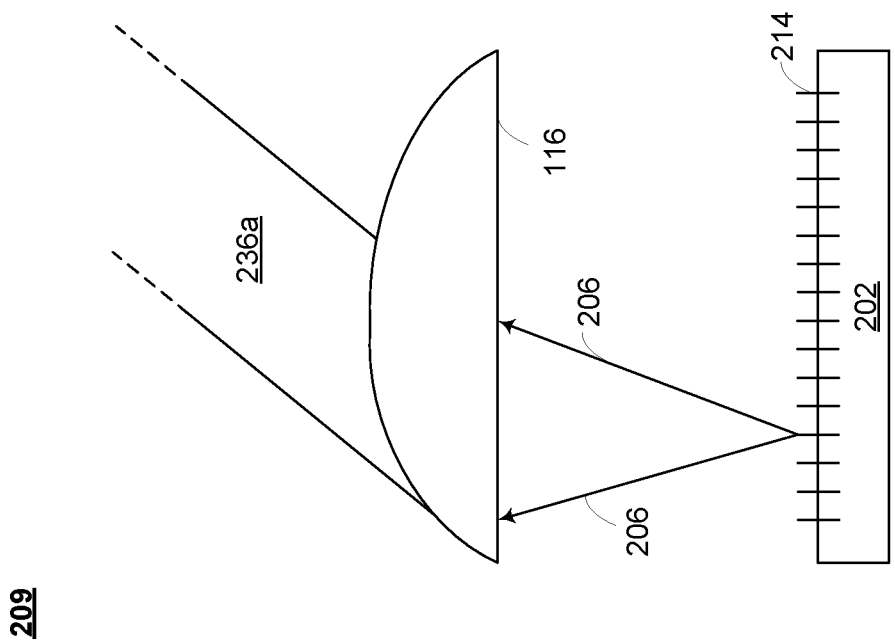
FIG. 2E is a diagram illustrating light emitted by the emitter array depicted in FIG. 2A in a first direction, according to embodiments of the disclosure.

Still referring to FIG. 2A, during a sensing procedure, at least one grating switch 214 from one or more of the waveguide branches 212 may be selectively and concurrently activated such that the light exiting from each of the activated grating switches 214 is directed in a particular direction (e.g., a certain angle) when collimated by a lens (see FIGS. 2E and 2F). In certain implementations, a column position 215 of grating switches 214 positioned along each of the waveguide branches 212, and located in the same column position, may be activated concurrently. However, in certain other implementations, one or more of the concurrently activated grating switches 214 may be in different column positions. In some embodiments, the waveguides may be designed such that light existing from each of the different column positions 215 may be used to sense information of a different pixel associated with a microscopic portion of an object being imaged and/or measured in the far-field. Hence, by sweeping through each of the different column positions 215 to emit light, all pixels may be imaged.

FIG. 2B illustrates a cross-sectional view 201 of an exemplary grating switch 214 that is deactivated, according to embodiments of the disclosure. FIG. 2C illustrates a cross-sectional view 203 of an exemplary grating switch 214 that is activated, according to embodiments of the disclosure. FIGS. 2B and 2C are described together below.

As seen in FIGS. 2B and 2C, emitter array 108 may include, among others, a substrate 216 (e.g., such as a silicon substrate), an insulating layer 218 (e.g., such as silicon dioxide), a waveguide branch 212 through which light 206 travels, first electrodes 222 positioned on either side of a lower grating structure 220 of grating switch 214, and second electrodes 234 positioned directly above first electrodes 222 and on either side of upper grating structure 226. Second electrodes 234 may be suspended above first electrodes 222, when deactivated, by torsion springs 232 that are coupled to anchors 230. In certain implementations, second electrodes 234 may have a same or similar surface area to the surface area of first electrodes 222.

As further seen in FIGS. 2B and 2C, grating switch 214 may include an individually actuatable upper grating structure 226 as well as a lower grating structure 220. Lower grating structure 220 may be patterned into waveguide branch 212 under upper grating structure 226. When deactivated as shown in FIG. 2B, upper grating structure 226 may be lifted up, e.g., with a MEMS architecture, and thus away from lower grating structure 220. Upper grating structure 226 may have a first grating index 228 (e.g., corresponding to a first grating pattern), and lower grating structure 220 may have a second grating index 224 (e.g., corresponding to a second grating pattern).

Referring to FIG. 2C, parallel plate actuation (e.g., using first electrodes 222 and second electrodes 234) may be used to couple/decouple upper grating structure 226 with lower grating structure 220. In other words, grating switch 214 may be activated when a voltage is applied to first electrodes 222 adjacent to lower grating structure 220 and/or second electrodes 234 adjacent to upper grating structure 226. As a result, upper grating structure 226 may be pulled down, e.g., by the MEMS architecture, to couple with lower grating structure 220. The coupled upper grating structure 226 and lower grating structure 220 form a grating device 250 having an effective grating index determined collectively by the first grating index 228 and the second grating index 224. In some embodiments, first grating index 228, second grating index 224, and the effective grating index may be selected based at least in part on the wavelength of light 206 such that light 206 only exits waveguide branch 212 when grating switch 214 couples to waveguide branch 212 and passes through the lower grating structure 220 without exiting waveguide branch 212 when grating switch 214 decouples from waveguide branch 212.

In certain other implementations, the lower grating structure 220 may be omitted from grating switch 214. Here, first grating index 228 may be selected such that light 206 exits through grating switch 214 when upper grating structure 226 is activated and couples to waveguide branch 212.

FIG. 2D illustrates a perspective view 205 of an exemplary grating switch 214, according to embodiments of the disclosure. Descriptions for certain structural elements of exemplary grating switch 214 previously provided above may be omitted below in connection with FIG. 2D.

Referring to FIG. 2D, when grating switch 214 is deactivated, upper grating structure 226 is decoupled from lower grating structure 214/waveguide branch 212. Upper grating structure 226 is supported above waveguide branch 212 by anchors 230 positioned on either side of grating switch 214. A plurality of torsion springs 232 couple upper grating structure 226 and second electrodes 234 to anchors 230. The spring constant of the torsion springs 232 may be selected such that when a voltage is selectively applied to first electrodes 222 and/or second electrodes 234, upper grating structure 226 may be pulled down and couple with the lower grating structure 224/waveguide branch 212. When the voltage is removed from first electrodes 222 and/or second electrodes 234, upper grating structure 226 decouples from the lower grating structure 224/waveguide branch 212 and returns to a floating position supported by the anchors 230 and torsion springs 232.

FIG. 2E illustrates a first diagram 209 of light transmitted in a first direction by emitter array 108 depicted in FIG. 2A, according to embodiments of the disclosure. FIG. 2F illustrates a second diagram 211 of light transmitted in a second direction by emitter array 108 depicted in FIG. 2A, according to embodiments of the disclosure. The cross-section views depicted in FIGS. 2E and 2F are oriented such that only the grating switches 214 positioned along one waveguide branch 212 are visible. The grating switches 214 positioned along the other waveguide branches 212 and located in the same column positions are located along an axis going into the page. FIGS. 2E and 2F will be described together.

Referring to the embodiment shown in FIG. 2E, grating switches 214 located in a fourth column position along each of the waveguide branches 212 are activated such that light 206 exits these grating switches 214 into the free space within transmitter 102 located under lens 116. As depicted in FIG. 2E, the diffused light 206 is collimated by lens 116 into a laser beam 236a (e.g., corresponding to laser beam 109) that is directed in a first direction.

Referring to the embodiments shown in FIG. 2F, grating switches 214 located in a twelfth column position along each of the waveguide branches 212 are activated such that light 206 exits these grating switches 214 into the free space within transmitter 102 located under lens 116. As depicted in FIG. 2F, the diffused light 206 is collimated by lens 116 into a laser beam 236b (e.g., corresponding to laser beam 109) that is directed in a second direction.

Figure 3:
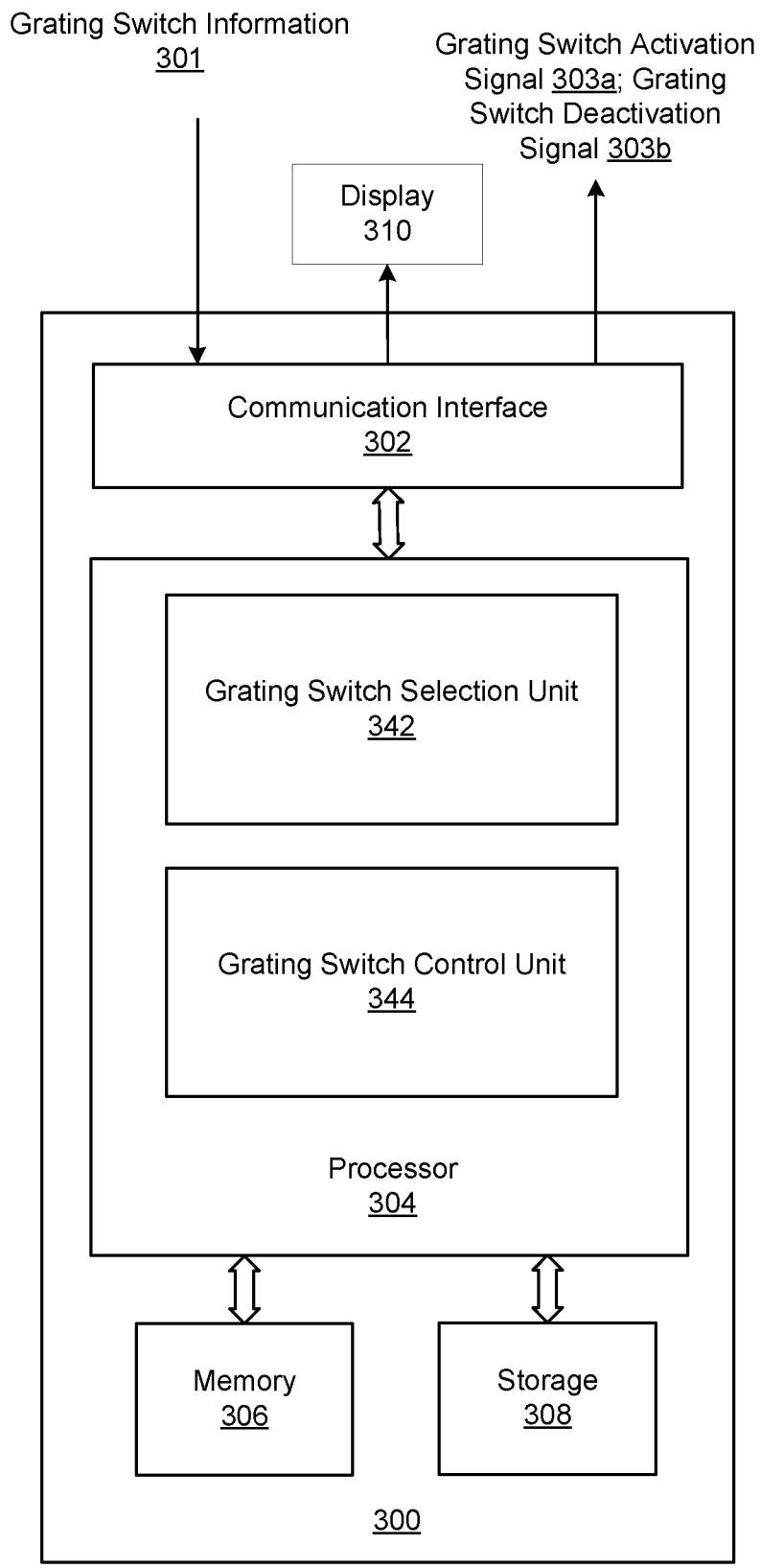
FIG. 3 illustrates a block diagram of an exemplary system for emitting light using an emitter array with a plurality of grating switches, according to embodiments of the disclosure.

FIG. 3 illustrates a block diagram of an exemplary system 300 for emitting light using an emitter array (e.g., emitter array 108 of FIGS. 1-2F), according to embodiments of the disclosure. In some embodiments, as shown in FIG. 3, system 300 may include a communication interface 302, a processor 304, a memory 306, and a storage 308. In some embodiments, system 300 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of system 300 may be located in a cloud or may be alternatively in a single location (such as inside a mobile device) or distributed locations. Components of system 300 may be in an integrated device or distributed at different locations but communicate with each other through a network (not shown). Consistent with the present disclosure, system 300 may be configured to selectively activate and/or deactivate one or more grating switches to emit light.

Communication interface 302 may send data to and receive data from components of transmitter 102 (including emitter array 108) and receiver 104 via wired communication methods, such as Serializer/Deserializer (SerDes), Low-voltage differential signaling (LVDS), Serial Peripheral Interface (SPI), etc. In some embodiments, communication interface 302 may optionally use wireless communication methods, such as a Wireless Local Area Network (WLAN), a Wide Area Network (WAN), wireless networks such as radio waves, a cellular network, and/or a local or short-range wireless network (e.g., Bluetooth™), or other communication methods. Communication interface 302 can send and receive electrical, electromagnetic or optical signals that carry digital data streams representing various types of information.

Consistent with some embodiments, communication interface 302 may receive grating switch information 301. By way of example and not limitation, grating switch information 301 may include one or more of, e.g., information indicating the beginning of a sensing cycle using grating switches used by an optical sensing system, the end of a sensing cycle, an order of grating switches or columns of grating switches to activate or deactivate, direction information of emitted light, or a correlation of sensing direction and grating switches, just to name a few. Communication interface 302 may further provide the received data to memory 306 and/or storage 308 for storage or to processor 304 for processing.

Processor 304 may include any appropriate type of general-purpose or special-purpose microprocessor, digital signal processor, or microcontroller. Processor 304 may be configured as a separate processor module dedicated to selecting one or more grating switches for activation or deactivation. Alternatively, processor 304 may be configured as a shared processor module for performing other functions in addition to grating switch selection.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform functions disclosed herein. For example, memory 306 and/or storage 308 may be configured to store program(s) that may be executed by processor 304 to perform a sensing procedure using one or more grating switches.

In some embodiments, memory 306 and/or storage 308 may also store various grating switch information including, e.g., a look-up table that correlates one or more grating switches with sensing directions, start and stop information for a sensing procedure that uses one or more grating switches, etc.

As shown in FIG. 3, processor 304 may include multiple modules, such as a grating switch selection unit 342, a grating switch control unit 344, and the like. These modules (and any corresponding sub-modules or sub-units) can be hardware units (e.g., portions of an integrated circuit) of processor 304 designed for use with other components or software units implemented by processor 304 through executing at least part of a program. The program may be stored on a computer-readable medium, and when executed by processor 304, it may perform one or more functions. Although FIG. 3 shows units 342 and 344 both within one processor 304, it is contemplated that these units may be distributed among different processors located closely or remotely with each other. For example, unit 342 may be part of a selection device and unit 344 may be part of a separate control device.

Figure 4:
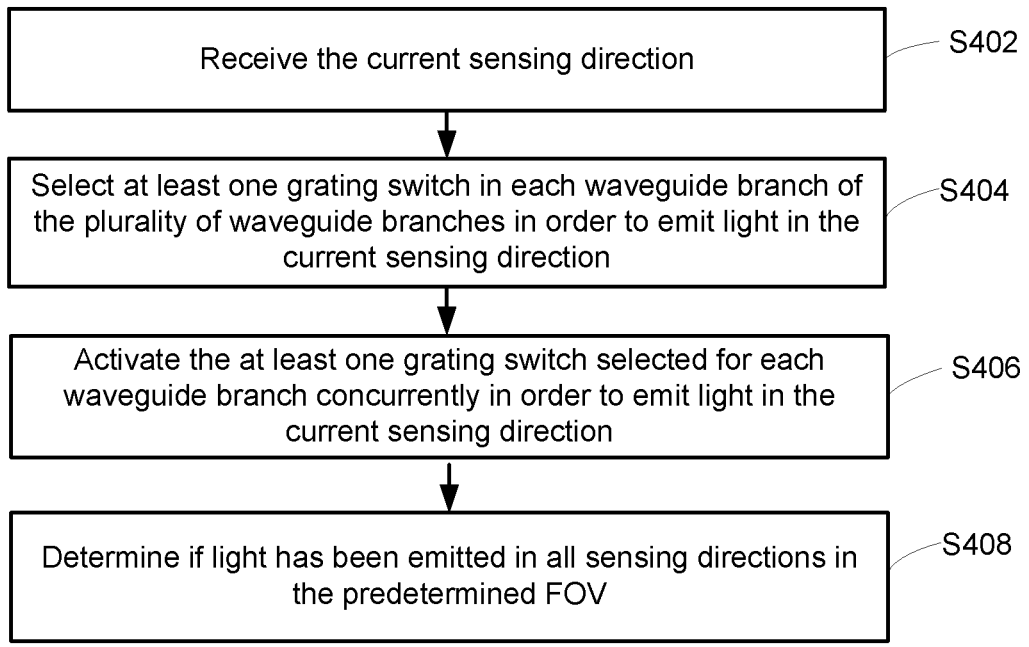
FIG. 4 illustrates a flow chart of an exemplary method for emitting light using an emitter array with a plurality of grating switches, according to embodiments of the disclosure.

In some embodiments, one or both of units 342-344 of FIG. 3 may execute computer instructions to emit light using an emitter array. FIG. 4 illustrates a flowchart of an exemplary method 400 for emitting light using an emitter array, according to embodiments of the disclosure. Method 400 may be performed by system 300 and particularly processor 304 or a separate processor not shown in FIG. 3. Method 400 may include steps S402-S408 as described below. It is to be appreciated that some of the steps may be optional, and some of the steps may be performed simultaneously, or in a different order than shown in FIG. 3. FIGS. 3 and 4 will be described together below.

In step S402, grating switch selection unit 342 may receive the current sensing direction, e.g., as part of grating switch information 301. In some embodiments, transmitter 102 is configured to emit light in various different sensing directions in a predetermined FOV in order to sense an object. The light may be emitted towards the object at the various different directions sequentially to sense the entire object.

In step S404, grating switch selection unit 342 may be configured to select at least one grating switch in each waveguide branch of the plurality of waveguide branches in order to emit light in the current sensing direction. For example, referring to FIG. 2A, at least one grating switch 214 from one or more of the waveguide branches 212 may be selectively and concurrently activated such that the light exiting from each of the activated grating switches 214 is directed in the current sensing direction (e.g., the first direction as shown in FIG. 2E). In certain implementations, a column position 215 of grating switches 214 positioned along each of the waveguide branches 212, and located in the same column position may be activated concurrently. However, in certain other implementations, one or more of the concurrently activated grating switches 214 may be in different column positions.

At step S406, grating switch control unit 344 may activate the at least one grating switch selected for each waveguide branch concurrently in order to emit light in the current sensing direction. In certain implementations, grating switch selection unit 342 may send a signal indicating the one or more selected grating switches for activation or deactivation. Upon receipt of the signal, the grating switch control unit 344 may output a grating switch activation signal 303a or a grating switch deactivation signal 303b, depending on whether the signal from the grating switch selection unit 342 indicates activation or deactivation. For example, referring to FIG. 2A, at least one grating switch 214 from one or more of the waveguide branches 212 may be selectively and concurrently activated such that the light exiting from each of the activated grating switches 214 is directed in a particular direction (e.g., a certain angle). Grating switch activation signal 303a and grating switch deactivation signal 303b may be a voltage signal applied to one or more of first electrodes 222 of lower grating structure 220 or second electrodes 234 of upper grating structure 226. For example, when a positive voltage is applied to one or more of first electrodes 222 or second electrodes 234, upper grating structure 226 is pulled down, e.g., by a MEMS architecture shown in FIG. 2B-2D, to couple with lower grating structure 220 via parallel plate actuation. When the voltage is removed (or a zero voltage is applied), upper grating structure 226 is lifted up, e.g., by the MEMS architecture, to decouple from lower grating structure 220. By activating the selected grating switches 214, for example in column positions 215, concurrently, emitter array 108 may emit light in the current sensing direction.

In step S408, system 300 may determine if light has been emitted in all sensing directions in the predetermined FOV. If it has been (S408: YES), method 400 may conclude. Otherwise (S408: NO), method 400 returns to step S402 to control emitter array 108 to emit light in the next sensing direction, e.g., the second direction as shown in FIG. 2F. Emitter array 108 may be designed such that each of the different column positions 215 may be associated with a direct sensing direction to image a different pixel associated with a microscopic portion of an object being imaged and/or measured in the far-field. Hence, by sweeping through each of the different column positions 215 to emit light, all sensing directions in the FOV may be covered and all pixels of the object are imaged.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. An emitter array for an optical sensing system, comprising:
   a waveguide including a plurality of waveguide branches; and
   a plurality of grating switches positioned along each of the plurality of waveguide branches and configured to selectively turn on or off the corresponding waveguide branch for transmitting light,
   wherein a grating switch comprises an upper grating structure configured to couple to a waveguide branch when the grating switch is activated to allow the light to emit from the waveguide branch.

2. The emitter array of claim 1, wherein the upper grating structure is configured to decouple from the waveguide branch when the grating switch is deactivated.

3. The emitter array of claim 1, wherein the grating switch further comprises a lower grating structure formed in the waveguide branch.

4. The emitter array of claim 3, wherein the upper grating structure has a first grating index and the lower grating structure has a second grating index.

5. The emitter array of claim 4, wherein when the grating switch is activated the upper grating structure and the lower grating structure form a grating device having an effective grating index determined collectively by the first grating index and the second grating index.

6. The emitter array of claim 5, wherein the grating device causes the light to deflect and exit the waveguide branch through the upper grating structure.

7. The emitter array of claim 3, further comprising:
   a pair of anchor structures formed on either side of the lower grating structure; and
   a plurality of springs that couple the upper grating structure to the pair of anchor structures.

8. The emitter array of claim 7, further comprising:
   a pair of electrodes formed on the lower grating structure,
   wherein the upper grating structure is configured to couple to the waveguide branch when a voltage is applied to the pair of electrodes.

9. The emitter array of claim 1, wherein the plurality of grating switches are individually actuated by respective MEMS actuators.

10. An optical sensing system, comprising:
a light source;
an emitter array coupled to the light source, the emitter array comprising:
   a waveguide including a plurality of waveguide branches; and
   a plurality of grating switches positioned along each of the plurality of waveguide branches and configured to selectively turn on or off the corresponding waveguide branch for transmitting light,
      wherein a grating switch comprises an upper grating structure configured to couple to a waveguide branch when the grating switch is activated to allow the light to emit from the waveguide branch.

11. The optical sensing system of claim 10, wherein the upper grating structure is configured to decouple from the waveguide branch when the grating switch is deactivated.

12. The optical sensing system of claim 10, wherein the grating switch further comprises a lower grating structure formed in the waveguide branch.

13. The optical sensing system of claim 12, wherein the upper grating structure has a first grating index and the lower grating structure has a second grating index.

14. The optical sensing system of claim 13, wherein when the grating switch is activated the upper grating structure and the lower grating structure form a grating device having an effective grating index determined collectively by the first grating index and the second grating index.

15. The optical sensing system of claim 14, wherein the grating device causes the light to deflect and exit the waveguide branch through the upper grating structure.

16. The optical sensing system of claim 15, further comprising:
   a pair of anchor structures formed on either side of the lower grating structure; and
   a plurality of springs that couple the upper grating structure to the pair of anchor structures.

17. The optical sensing system of claim 16, further comprising:
   a pair of electrodes formed on the lower grating structure, wherein the upper grating structure is configured to couple to the waveguide branch when a voltage is applied to the pair of electrodes.

18. The optical sensing system of claim 10, further comprising:
   a lens positioned above the waveguide,
      wherein the lens configured to collimate light emitted by the plurality of grating switches.

19. The optical sensing system of claim 10, wherein the plurality of grating switches are individually actuated by respective MEMS actuators.

20. A method of emitting light using an emitter array, comprising:
   coupling light from a light source to a waveguide, the waveguide comprising a plurality of waveguide branches each having a plurality of grating switches positioned thereon; and
   selectively activating at least one grating switch from each waveguide branch concurrently,
      wherein a grating switch comprises an upper grating structure configured to couple to a waveguide branch when the grating switch is activated to allow the light to emit from the waveguide branch.

* * * * *